C. G. AND O. C. SCHMIDT.
CARCASS DEHAIRING AND CLEANING MACHINE.
APPLICATION FILED DEC. 17, 1917.

1,388,898.

Patented Aug. 30, 1921.

Inventors
Charles G. Schmidt,
Oscar C. Schmidt,

UNITED STATES PATENT OFFICE.

CHARLES G. SCHMIDT AND OSCAR C. SCHMIDT, OF CINCINNATI, OHIO, ASSIGNORS TO THE CINCINNATI BUTCHERS' SUPPLY COMPANY, OF CINCINNATI, OHIO, A CORPORATION OF OHIO.

CARCASS DEHAIRING AND CLEANING MACHINE.

1,388,898.   Specification of Letters Patent.   Patented Aug. 30, 1921.

Continuation of application Serial No. 100,839, filed May 31, 1916. This application filed December 17, 1917. Serial No. 207,581.

*To all whom it may concern:*

Be it known that we, CHARLES G. SCHMIDT and OSCAR C. SCHMIDT, citizens of the United States, residing at Cincinnati, in the county of Hamilton and State of Ohio, have jointly invented certain new and useful Improvements in Carcass Dehairing and Cleaning Machines, of which the following is a specification.

The present application is a substitution for and continuation of our prior application for patent on improvements in hog scrapers, Serial No. 100,839, filed May 31, 1916, as to all matters common to said prior application and the present application, we having filed, of even date herewith, a written declaration of abandonment of said prior application only but not of the invention therein shown and described, or any part of said invention.

Machines of this character as heretofore constructed have usually embodied independent moving means for rotating the carcass during action thereon by scrapers, these independent means usually comprising rotating supports, traveling supports, or traveling tables or sprocket chains, or additional beaters other than the scrapers primarily concerned in the scraping or cleaning operations. The provision of such independent operated means for rotating the carcass during the cleaning operation is expensive in first cost of the machine and in the space occupied by the same, and the operation of such additional means requires the expenditure of considerable power and the additional devices further are liable to get out of order and require repair and replacement.

In our improved machine such additional operated means for rotating the carcass are dispensed with, and the parts are so arranged and related that a single scraping or cleaning mechanism at one side of the carcass acts not only to scrape and clean the carcass, but also to rotate the same, thereby dispensing with additional means for causing such rotation.

It is the object of our invention therefore to provide carcass supporting means and rotary dehairing or cleaning means coacting therewith arranged to move upwardly through said carcass supporting means into carcass contacting position, and to provide said carcass supporting means with relatively stationary means to confine the carcass within the radius of action of the dehairing or cleaning means.

It is the object of our invention, further, to provide novel means whereby the carcass, which has been operated on, is moved laterally away from the scrapers for discharging the same; further, to provide a dehairing mechanism comprising a carcass-support having a carcass supporting depression and rotary dehairing means which perform the dehairing operations, whose axes of rotation are located solely to one side of the longitudinal vertical middle of said carcass supporting depression, said dehairing means comprising dehairing devices which pass through said carcass supporting means into contact with the carcass in said depression; further, to provide means disposed becass supporting depression, said dehairing means and arranged to be moved transversely to the supporting face of the carcass-support away from said rotary dehairing means for discharging the carcass; further, to provide a carcass dehairing mechanism comprising a carcass supporting depression, rotary dehairing means acting on the carcass through the wall of said depression, a scalding tank at the side of said depression, and means whereby to charge said carcass into said supporting depression at one side of said depression and for discharging said carcass upwardly at the other side of said depression.

The invention will be further readily understood from the following description and claims, and from the drawing, in which latter:

Figure 1:
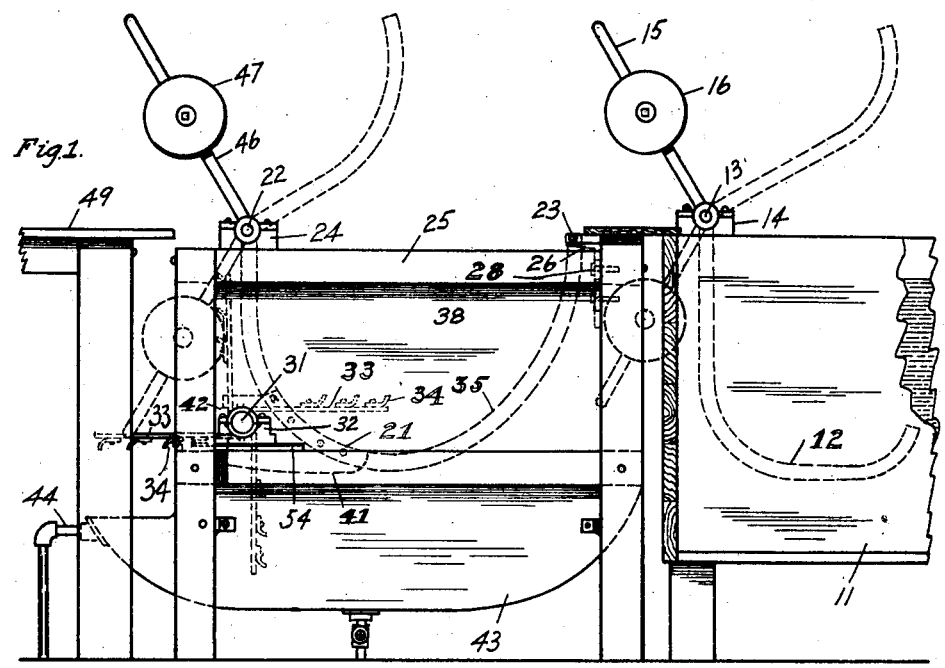
Figure 1 is an end elevation of our improved device.
Figure 2:
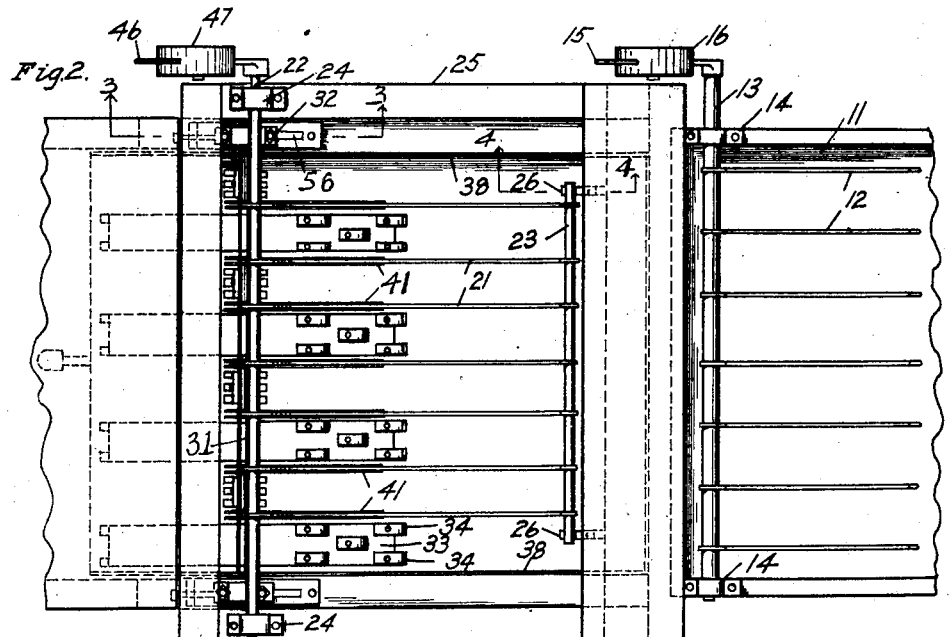
Fig. 2 is a plan view of the same.
Figure 3:
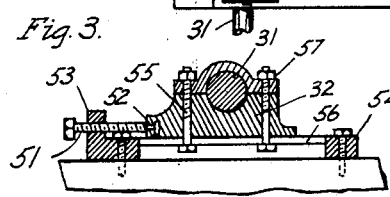
Fig. 3 is a sectional detail taken on the section line 3—3 of Fig. 2.
Figure 4:
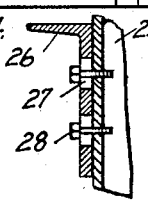
Fig. 4 is a sectional detail taken on the section line 4—4 of Fig. 2.

We have shown and described our invention as applicable in a machine for use in dehairing and cleaning slaughtered hog carcasses, such machines being also known as hog scrapers.

Immediately after the hogs are killed, the carcasses are scalded to facilitate the removal of the hair. This scalding usually takes place in a tank containing hot water, such a tank being exemplified at 11.

After being subjected to the scalding action for a sufficient length of time, the carcasses are, in the present exemplification of our invention, transferred to the dehairing mechanism, being preferably charged into the dehairing device from the side of the same. This is shown as accomplished by a tilting shifter or throw-out, shown as consisting of a series of spaced-apart hook-shaped bars 12 rigid with a rock-shaft 13, journaled in bearings 14 on the tank.

Suitable means are provided for actuating the rock-shaft, exemplified as a manually operated arm 15, fixed to the rock-shaft, carrying a counterweight 16 for counterbalancing the throw-out, although it is obvious that power or other means may be employed for the purpose.

The bars 12 normally occupy a position within the tank, below the level of the water therein. The carcass which it is desired to remove from the tank is floated over the bars so as to extend lengthwise across the same. The throw-out is then tilted by means of the operating arm 15 to raise the carcass out of the tank, the tilting taking place to such extent, exemplified by the dotted lines in Fig. 1, that the carcass slides off of the bars into the dehairing mechanism.

It is desirable, for well known reasons, that the hair be removed from the carcass without delay after the carcass is removed from the scalding water, for which purpose the dehairing mechanism is positioned as close as possible to the tank.

The dehairing mechanism comprises a carcass-support, having a carcass supporting depression, in which the carcass is arranged to be received, and a rotary dehairing means having hair removing devices thereon, the axis of rotation of the rotary dehairing means extending lengthwise of the depression outside of the supporting portions of said depression, and said hair removing devices extending through the wall of said depression into contact with the carcass therein.

The carcass-support is exemplified as a grate having a carcass supporting depression therein. The rotating dehairing devices are arranged to pass through the spaces between the bars of said grate into contact with the carcass.

In the present exemplification the grate comprises a series of spaced-apart bars 21, substantially semi-circular or U-shaped, arranged and combined in a rigid structure to form a pocket or grate of permanent shape. The bars are connected to a rock-shaft 22 at one of their ends, and at their other ends are secured to a rod 23 to maintain their alinement and relative positions.

The rock-shaft is journaled in bearings 24 on a suitable frame 25. Brackets 26 are arranged to support the rod 23 for supporting the grate within the frame, when in operative position, this operative position being such that when the carcass is raised out of the scalding tank by the throw-out and the throw-out tilted upwardly to incline its normal upper portion downwardly toward the carcass-support, the carcass will slide from said throw-out into said carcass-support. The brackets 26 are preferably adjustable, as by being provided with slots 27 through which bolts 28 pass into the frame for securing the brackets to the frame in adjusted positions.

The carcass in the carcass-support is subjected to the action of the rotary dehairing means. The rotary dehairing means are exemplified as comprising a rotatable shaft 31, journaled in bearings 32 in the frame, and having arms 33 extending therefrom. These arms, with the scrapers 34 secured thereto, exemplify the dehairing devices in the present exemplification of our invention. The said arms are slightly flexible and are resilient and move rotatingly rapidly in the spaces between the bars of the grate into contact with the carcass, on which they exert a drawing action for dehairing the carcass and rotating the same.

The carcass-support is provided with a wall 35 at the side thereof opposite the dehairing means, the wall being provided by the form of the bars 21 at the sides thereof opposite the dehairer. This wall slopes with a marked inclination downwardly toward the path of the scrapers for causing the carcass to move by gravity into the radius of action of the scraping devices and to be automatically maintained in active relation with said scraping devices during rotation of the latter, whereby the upwardly moving scrapers contacting the proximate side of the carcass act to rotate the carcass. The rapid rotation of the dehairing means causes the dehairing devices to be thrust outwardly quite stiffly for aiding in the rotation of the carcass.

The shaft 31 is arranged to be driven by suitable power means and to rotate rapidly in the direction indicated by the arrow $a$, in Fig. 1, and in consequence of the rapidly changing contact of the arms 33 and of the scrapers 34 with the carcass, the latter is continuously rolled over and tumbled about in the grate, as well as shifted more or less endwise back and forth therein, so that all parts of the carcass are acted on by the scrapers in order to thoroughly remove the hair therefrom and to clean and polish the same.

The frame is preferably closed by end boards 38 to limit undue endwise movement of the carcass and properly retain the carcass on the carcass supporting means during operation thereon by the dehairing means.

Partitions extend in the space between the bars and the shaft 31 and into the spaces between the arms 33 to guide said arms and cause them to move properly in the spaces between the said bars, and also to guide the legs of the carcass between said bars and between said arms to avoid injury to said legs and prevent stoppage of movement of the carcass. The partitions are exemplified as plates 41 secured to the bars 21 and extending about the shaft 31, the plates being provided with recesses 42 for the latter purpose.

Water is sprayed over the carcass while being operated on by the dehairing means, in usual manner, to keep the carcass wet and to rinse the hair and scurf loosened during the dehairing operation, the water, scurf and hair dropping into a pan 43 provided with an overflow 44.

Novel means are provided for removing the carcass from the carcass supporting means after the carcass has been subjected to the action of the dehairing means the required length of time. This is accomplished by interposing a shifting means between the carcass position and the shaft 31 to shift the carcass transversely to the supporting face for the carcass in carcass-position and away from the dehairing means. These shifting means are exemplified as the carcass supporting means, which are rockingly pivoted for the purpose in bearings 24, so that the same together with the carcass therein may be moved laterally away from the rotary dehairing means, as in tilting manner, to simultaneously raise the carcass out of operative relation with the rotary dehairing means and to cause the same to be discharged from the carcass supporting means.

This operation is shown accomplished by means of an operating arm 46, exemplified as a manually operated arm, although it is obvious that the tilting of the carcass supporting means may be accomplished by suitable power mechanism. The operating arm is exemplified as provided with a counterbalancing weight 47 to counterbalance the carcass supporting means and the carcass therein.

The discharge position of the carcass supporting means is exemplified in dotted lines in Fig. 1, in which position the upper portion of the pivoted side of the carcass-support is in downwardly inclined relation for discharging the carcass, for instance on to a suitable finishing table 49, for further suitable and well-known operation upon the carcass, the table for the purpose being positioned close to the carcass supporting means.

The position of the shaft 31 and the direction in which it extends with relation to the grate, is adjustable by providing suitable means for adjusting the bearings 32, in which the shaft is journaled. The adjustment is shown accomplished by an adjusting bolt 51 held endwise in the bearing by a swivel 52 and having threaded engagement in a lug 53 of a bearing-plate 54 secured to the frame, bolts 55 whose heads are received under the walls of slots 56 in the bearing-plate and nuts 57 received over the threaded ends of the bolts clamping the bearings in adjusted positions. The relation between the grate-bars and the scraper arms is adjusted in one or two directions, by means of the adjustment of the shaft 31 and of the brackets 26, to compensate for variation in the flexibility or positions of the arms.

As will be observed, three of the most important devices concerned in the treatment of hogs and used in packing houses, namely, the scalding tank, the dehairing machine, and the finishing table, are placed relatively to each other in a most advantageous position and so that a carcass passes directly from one to another and in a manner that one manipulation effects the transition in each case between the adjacent devices and shifts the carcass from one to the other, which transition is aided by the fact that the devices concerned are positioned so that their tops are substantially on a level.

Our improved device further provides a machine which is comparatively low and is open at its top so that the carcasses may be readily charged into and discharged from the top and so that the operations on the carcass may be readily observed in order that discharge of the carcass may be effected as soon as the operation has proceeded to the desired extent.

Having thus fully described our invention, what we claim as new and desire to secure by Letters Patent, is:

1. In a hog-scraper, a rigid pocket-shaped grate adapted to receive and to hold a carcass, hair-removing devices operating in said grate, and means to support this grate in a manner permitting it to be bodily canted in its entirety to effect discharge of the carcass.

2. In a hog-scraper, the combination of a rigid structure of permanent shape constructed to form a pocket-shaped grate adapted to receive a carcass, hair-removing devices operating in the lower part thereof, and means to bodily cant this grate and to tilt it until discharge of the carcass is effected.

3. In a hog-scraper, a support for the carcass consisting of a set of integral substantially semi-circular bars all connected so as to form a rigid pocket-shaped grate, and hair-removing means adapted to operate in said grate.

4. In a hog-scraper, hair-removing means, and a pocket-shaped grate in the lower part of which these means operate and which supports the carcass while being acted upon by these means, said grate being open on top to admit the carcass to it and to permit its discharge from the top.

5. In a hog-scraper, the combination of a series of spaced bars arranged and curved to form a pocket-shaped grate adapted to receive a carcass, hair-removing devices operating in the lower part thereof, a rock-shaft to which these bars are secured at one of their ends, and means to actuate this rock-shaft so as to cant these bars with the carcass on them until it slides out of the grate.

6. In a hog-scraper, the combination of a pocket-shaped grate adapted to receive a carcass, hair-removing devices operating in the grate, and means to raise and tilt the grate until the carcass slides out of the same.

7. In a hog-scraper, the combination of a pocket-shaped grate adapted to receive a carcass, hair-removing devices operating in the grate, a finishing table positioned adjacent the grate, and means to tilt the grate with the carcass and to deposit the latter by means of the grate upon said table.

8. In a hog-scraper, the combination of a set of spaced, substantially U-shaped bars rigidly connected to form a pocket-shaped grate adapted to receive a carcass, a shaft supported outside of this grate and positioned to extend along on one side thereof, scraper-arms on this shaft extending through the spaces between the bars and reaching into the grate, and means to rotate this shaft so that the scraper-arms effect removal of the hair from the carcass while rotating the carcass between them and the bars of the grate.

9. In a hog-scraper, the combination of a set of spaced bars shaped and connected to form a pocket-shaped grate adapted to support a carcass, a shaft supported outside of this grate, scraper-arms mounted on this shaft extending into the grate between the bars thereof, means to rotate the shaft so that these arms sweep through the grate and past the bars thereof, and guides extending between these bars and the shaft to hold the scraper-arms to their movement between the bars.

10. In a hog-scraper, the combination of rotary hair-removing means, and a grate in which they operate and which is composed of substantially U-shaped bars adapted to so hold a carcass that this latter by the inter-action of the hair-removing means with the grate receives also a rotary motion while being dehaired.

11. In a hog-scraper, the combination of a pocket-shaped grate composed of substantially U-shaped bars adapted to receive a carcass, a shaft positioned outside of this grate, scraper-arms on this shaft which extend into the grate, and means to rotate this shaft so that the scraper-arms thereon rotate the carcass between them and the side of the grate while also removing the hair.

12. In a hog-scraper, the combination of a frame, a series of U-shaped bars fixed throughout their lengths and connected to said frame in spaced relation and curved to form a concave support adapted to contain the carcass, and hair-removing means operating in said support solely at one side thereof.

13. In a hog-scraper, the combination of a frame, a series of U-shaped bars fixed throughout their lengths and connected to said frame in spaced relation and curved to form a concave support adapted to contain the carcass, and scrapers operating in said support and between the spaces of the bars to remove the hair from the carcass.

14. In a hog-scraper, the combination of a rigidly connected support having a carcass supporting depression of permanent shape and adapted to contain a carcass lengthwise, scrapers to remove the hair from the carcass, flexible arms on which they are carried, a shaft on which these arms are seated and which is mounted outside the supporting portion of the support, and means to operate this shaft so as to cause the scrapers carried by the flexible arms to act upon the carcass while said arms pass through the support at said carcass supporting depression.

15. In a machine of the character described, the combination of carcass supporting means, a rotary cleaning means having an axis of rotation outside the carcass supporting portion of said carcass supporting means, and means for upward pivot-wise movement of said carcass supporting means to discharge the carcass.

16. In a machine of the character described, the combination of carcass supporting means having a carcass supporting depression, a rotary cleaning means having an axis of rotation outside said carcass supporting depression, said rotary cleaning means comprising cleaning devices reaching through said carcass supporting means and thereby acting on the carcass from outside said carcass supporting depression, and means for moving said carcass supporting means transversely with relation to said axis of rotation for discharging the carcass.

17. In a machine of the character described, the combination of a rotatable dehairing means comprising yieldable dehairing devices, and means having openings through which said dehairing devices act on the carcass and for discharging said carcass whereby the carcass is moved away from said dehairing means in a direction transverse to the plane in which the supporting face of said last-named means is located when said dehairing means and said last-named means are in carcass dehairing relation.

18. In a machine of the character described, the combination of means having a carcass supporting depression and for discharging the carcass, a rotatable dehairing means having an axis of rotation to the side of said depression, said rotatable dehairing means comprising dehairing devices acting through the carcass supporting wall of said depression on the carcass, and constructed and arranged whereby the carcass is moved away from said dehairing means in a direction transverse to the face of the supporting portion of said carcass supporting wall.

19. In a machine of the character described, the combination of a carcass-support having a carcass supporting depression, a rotatable dehairing means comprising dehairing devices acting on the carcass through said carcass-support, and means for tilting said carcass support transversely away from said dehairing means to incline the carcass supporting portion of said carcass-support downwardly for discharge of the carcass.

20. In a machine of the character described, the combination of rotatable dehairing means comprising dehairing devices, a carcass-support having a carcass supporting depression laterally disposed with relation to the axis of rotation of said rotatable dehairing means and provided with openings through which said dehairing devices act on the carcass, and means for moving said carcass transverse to the plane of said carcass supporting depression for discharge of the carcass.

21. In a carcass-dehairing machine, the combination of a carcass-support provided with a carcass-supporting depression having relatively rigid walls at the bottom and both sides of said carcass-support, and rotatable dehairing means having coincident axes of rotation solely at one side of the longitudinal middle of said carcass-support, said rotatable dehairing means constituting the sole moving means to rotate said carcass.

22. In a hog-dehairer, the combination of a hog-supporting means provided with a carcass-supporting depression having relatively rigid walls at the bottom and both sides of said carcass-support, and rotatable hog-cleaning means comprising yieldable scraping devices located solely in one position about the lengthwise axis of said hog-supporting means and adapted to act on the hog from below.

23. In a hog-scraper, the combination of positioning means for the hog, and rotatable scraping means having axes of rotation located solely to one side of the median line of said positioning means parallel with said axes, said rotatable scraping means having a path of movement extending below the level of the hog position, said supporting means and said rotatable scraping means constituting the sole means acting counter to each other for causing contact between said carcass and rotatable scraping means.

24. In a machine of the character described, the combination of rotary carcass cleaning means provided with cleaning devices, a carcass-support having a carcass supporting depression and openings through which said cleaning devices act on the carcass to clean the same, the axes of rotation of the rotary cleaning means located solely at one side of said depression, and means at the other side of said depression acting solely by gravity on the carcass for coaction between said carcass and said rotary cleaning means.

25. In a carcass cleaning machine, the combination of a carcass-support provided with openings having walls therebetween, and a rotary carcass cleaning means comprising a central rotary part and cleaning devices extending from said rotary part and arranged to pass said openings into contact with the carcass, the axis of rotation of said central rotary part located outside the carcass supporting portion of said carcass-support, and partitions extending between said walls and said central rotary part for guiding the legs of the carcass past said central rotary part and walls during rotation of the carcass.

26. In a carcass cleaning machine, the combination of a carcass-support having openings therein and walls between said openings, and a rotary carcass cleaning means comprising a shaft and radially extending flexible cleaning devices, said radially extending flexible cleaning devices arranged to move through said openings into contact with the carcass, and said carcass-support provided with guide-walls extending toward said shaft forming guiding means for said radially extending flexible cleaning devices.

27. In a machine of the character described, the combination of rotary cleaning means acting to one side of the lower portion of the carcass-position, and means between said carcass-position and the axis of rotation of said rotary cleaning means movable crosswise of said carcass-position away from said rotary cleaning means to discharge the carcass.

28. In a machine of the character described, the combination of carcass supporting means, and rotary dehairing means comprising dehairing devices moving transversely past the supporting faces of said supporting means into contact with the carcass supported thereby, said carcass supporting means comprising relatively stationary means to confine the carcass within the radius of action of said scraping means, whereby said scraping means rotate the carcass.

29. In a machine of the character described, the combination of a rotary dehairing means comprising radiating arms having scrapers thereon, carcass supporting bars having spaces therebetween, said radiating arms and scrapers rotating in said spaces, said bars connected for forming a carcass-support, and means for adjusting the positional relation between said rotary dehairing means and said carcass-support for adjusting the directional relation between said arms and bars.

30. In a machine of the character described, the combination of a carcass supporting means mounted pivotwise, a rotary cleaning means having an axis of rotation located with relation to said carcass supporting means whereby to clean the carcass, and said pivotwise mounting arranged whereby to move said carcass supporting means with an upward movement about its pivotwise mounting to discharge the carcass about said rotary cleaning means.

31. In a machine of the character described, the combination of rotatable dehairing means, a carcass supporting means, said rotatable dehairing means acting on the carcass from below, said rotatable dehairing means constituting the sole moving means to rotate said carcass, and said carcass supporting means acting to yieldingly hold the carcass in engaging relation with said rotatable dehairing means by gravity.

32. In a carcass dehairing machine, the combination of a carcass support having a carcass supporting portion, rotatable dehairing means comprising yieldable dehairing devices having a path extending below the horizontal plane of said carcass supporting portion, said rotatable dehairing means constituting the sole moving means to rotate the carcass and said carcass support constituting the sole means to yieldingly hold the carcass within the operating range of said dehairing devices.

In testimony whereof, we have hereunto signed our names in the presence of two subscribing witnesses.

CHARLES G. SCHMIDT.
OSCAR C. SCHMIDT.

Witnesses:
JAMES J. FITZPATRICK,
THERESA M. SILBER.